(12) United States Patent
Sachdeva et al.

(10) Patent No.: US 12,353,782 B1
(45) Date of Patent: Jul. 8, 2025

(54) SYSTEM AND METHOD FOR QR CODE BASED MIRRORING OF MOBILE SCREEN TO COMPUTER

(71) Applicant: Whatfix Private Limited, Bangalore (IN)

(72) Inventors: Sahil Sachdeva, Bangalore (IN); Gaurav Singh, Bangalore (IN); Arnold Laishram, Bangalore (IN); Shreyansh Sharma, Bangalore (IN)

(73) Assignee: WHATFIX PRIVATE LIMITED, San Jose, CA (US)

( * ) Notice: Subject to any disclaimer, the term of this patent is extended or adjusted under 35 U.S.C. 154(b) by 0 days.

(21) Appl. No.: 18/170,382

(22) Filed: Feb. 16, 2023

(51) Int. Cl.
| | |
|---|---|
| *G06F 3/0484* | (2022.01) |
| *G06F 3/14* | (2006.01) |
| *G06K 7/14* | (2006.01) |
| *H04L 65/1069* | (2022.01) |
| *H04L 65/61* | (2022.01) |

(52) U.S. Cl.
CPC .......... *G06F 3/1454* (2013.01); *G06F 3/0484* (2013.01); *G06K 7/1417* (2013.01); *H04L 65/61* (2022.05); *H04L 65/1069* (2013.01)

(58) Field of Classification Search
CPC ... G06F 3/1454; G06F 3/0484; G06K 7/1417; G06T 17/00; H04L 65/61; H04L 65/1069
See application file for complete search history.

(56) References Cited

U.S. PATENT DOCUMENTS

| | | | | |
|---|---|---|---|---|
| 10,567,480 | B2* | 2/2020 | Loader | H04L 67/10 |
| 2018/0019981 | A1* | 1/2018 | Leavy | H04L 51/04 |
| 2021/0392054 | A1* | 12/2021 | David | G06K 7/10297 |
| 2021/0406047 | A1* | 12/2021 | Namburu | G06F 9/453 |
| 2022/0321420 | A1* | 10/2022 | Sathya | H04N 21/4788 |
| 2023/0247069 | A1* | 8/2023 | Khire | H04N 19/172 348/14.08 |
| 2024/0045574 | A1* | 2/2024 | Nagpal | H04N 7/147 |

FOREIGN PATENT DOCUMENTS

JP          2023113070 A    *  8/2023

OTHER PUBLICATIONS

Clarivate Analytics, JP-2023113070-A (Translation) p. 1-14 (Year: 2024).*

* cited by examiner

*Primary Examiner* — Schquita D Goodwin
*Assistant Examiner* — Joseph M Cousins
(74) *Attorney, Agent, or Firm* — PATENT LAW WORKS LLP (57) ABSTRACT

A technique for screen mirroring of a mobile device with a laptop or desktop computer via an encoded room ID in a machine-readable optical image code displayed on the laptop or desktop computer. The mobile device scans the optical image code and discovers the room ID. The room ID is used to establish secure screen mirroring.

15 Claims, 11 Drawing Sheets

Dashboard application gets a unique ID (UID) from an entity responsible for secure screen mirroring 302

Dashboard application displays, on a screen of a computer, an optical image code encoding the UID 304

A mobile device application operating on a mobile device of the user scans and decode the optical image code displayed on the dashboard 306

In response to the entity detecting a match between the decoded identifier and the UID, secure communication is mediated between the dashboard and the mobile device 310

Mobile device sends packets of images displayed of the mobile device screen to the dashboard 312

Screen capture mode initiated to securely send a high resolution screenshot and element hierarchy to the dashboard to mirror the mobile device screen on the dashboard 314

DAP content creator uses mirrored mobile device screen to create DAP content for mobile applications 316

Fig. 3

```
┌─────────────────────────────────────────────────────────────────┐
│ DAP dashboard application gets a unique room ID from the at least one │
│ server responsible for orchestrating secure screen mirroring 402 │
└─────────────────────────────────────────────────────────────────┘
                                  ▼
┌─────────────────────────────────────────────────────────────────┐
│ DAP dashboard displays QR code on a display of the computer, the QR │
│ code encoding the room ID 404                                   │
└─────────────────────────────────────────────────────────────────┘
                                  ▼
┌─────────────────────────────────────────────────────────────────┐
│ DAP dashboard is connected to the room associated with the room ID 406 │
└─────────────────────────────────────────────────────────────────┘
                                  ▼
┌─────────────────────────────────────────────────────────────────┐
│ Mobile computing device with installed software development kit scans the │
│ QR code 408                                                     │
└─────────────────────────────────────────────────────────────────┘
                                  ▼
┌─────────────────────────────────────────────────────────────────┐
│ The software development kit of the mobile computing device decodes the │
│ QR code 410                                                     │
└─────────────────────────────────────────────────────────────────┘
                                  ▼
┌─────────────────────────────────────────────────────────────────┐
│ In response to the validating a match between the decoded identifier and │
│ the room identifier, the at least one server connects the software │
│ development kit of the mobile device to the room 412            │
└─────────────────────────────────────────────────────────────────┘
                                  ▼
┌─────────────────────────────────────────────────────────────────┐
│ The software development kit of the mobile computing device splits image │
│ frames displayed on the mobile computing device into packets that are sent │
│ to the dashboard 414                                            │
└─────────────────────────────────────────────────────────────────┘
                                  ▼
┌─────────────────────────────────────────────────────────────────┐
│ Resolution of images sent by the mobile computing device adjusted based │
│ on available bandwidth 416                                      │
└─────────────────────────────────────────────────────────────────┘
                                  ▼
┌─────────────────────────────────────────────────────────────────┐
│ Screen capture mode initiated to securely send a high resolution │
│ screenshot and screen element hierarchy to the dashboard 418    │
└─────────────────────────────────────────────────────────────────┘
```

Figure 9

SYSTEM AND METHOD FOR QR CODE BASED MIRRORING OF MOBILE SCREEN TO COMPUTER

TECHNICAL FIELD

The present disclosure is related to mirroring of a mobile device screen to a computer.

BACKGROUND

A digital adoption platform (DAP) is a type of software that is layered on top of another software, app, or website to help facilitate end user proficiency by helping to guide users through key tasks and provide contextual information as users navigate the user interface of the product. Users are provided with information to help familiarize them and become more proficient. This helps to drive adoption.

For example, a DAP may generate a help tip. Background information on an example DAP implementation is found in various sources, including U.S. Pat. No. 11,372,661 assigned to Whatfix Private Limited, the contents of which are hereby incorporated by reference. A DAP supports content authoring modules and content playback modules to generate, for example, smart tips as a user navigates elements of a user interface of an underlying software application.

A DAP supports content creators creating new flows or other guided features to enable higher adoption of client applications. Content Creators can create content, record a flow, and the content is played back with the same flow as and when required when end-user clients navigate the client application. This requires the DAP to find the visual UI elements on the application the user is looking at (e.g., finding where the user's cursor is located on a graphical user interface).

DAP solutions may be used with mobile applications (e.g., providing help for users of mobile computing devices to navigate mobile application running on smartphones, tablet devices, etc.). Content creators create content available to end users through their mobile devices. However, the small screen size of a mobile computing device, relative to a laptop or desktop computer, makes it cumbersome to create DAP content directly on the small screen size of a mobile computing device, such as a smartphone. One option is to provide a way for content authors to create content using a laptop or desktop computer, the author may create the DAP content on their laptop or notebook computer.

However, there are a variety of problems with using conventional approaches to mirroring a mobile device screen on a user's computer. Conventionally, the mobile computing device and the user's computer would need to either be physically connected or be in the same local area network for conventional approaches to mirroring of the screen of a mobile device to work. For example, Chromecast® mirrors a mobile device screen onto a television screen, but this approach needs a special device attached to the television. Also, both the mobile device and the television need to be connected to the same Wi-Fi network. Vysor® mirrors a complete mobile screen onto a desktop computer and supports interactions. However, this requires an additional application to be installed on the mobile device and the desktop computer, as well as a specific driver to be installed on the desktop computer. Vysor® also requires the mobile device to be connected to the desktop computer via a USB cable.

SUMMARY

An apparatus, system, and method for screen mirroring is disclosed. A room ID is encoded in a machine-readable optical image code displayed on a laptop or desktop computer. A mobile device scans the optical image code and discovers the room ID. The room ID is used to establish secure screen mirroring.

In one implementation, a method of screen mirroring includes generating, by at least one server, a unique identifier, the unique identifier being different than a network address identifier associated with the at least one server. The method includes providing, by at least one server, the unique identifier to a computer configured to display, on a display screen of the computer, a machine-readable optical image code encoding the unique identifier. The method includes monitoring, by at least one server, for receipt of the unique identifier from a mobile computing device configured to optically scan and decode the optical image code, generate a decoded identifier, and transmit the decoded identifier via a wireless Internet communication link to the at least one server. The method includes mediating screen mirroring of the display screen of the mobile computing device with the computer in response to validating that the decoded identifier matches the unique identifier.

In one implementation, the unique identifier is a room identifier (ID) of a virtual room. The room ID may be randomly generated to support an individual instance of screen sharing. In one implementation, The computer is joined to the virtual room associated with the room ID by the at least one server and waits for the mobile computing device to be joined to the virtual room by the at least one server.

In one implementation, at least one server comprises a socket server and a server to orchestrate the secure screen mirroring.

In one implementation, the optical image code is a QR code.

In one implementation, the screen mirroring comprises live streaming of user interface display contents of the mobile computing device.

In one implementation, live streaming of user interface display contents of the mobile computing device has a resolution adapted based at least in part on a bandwidth of a wireless Internet communication link of the mobile computing device.

In one implementation a screen resolution is adapted, based on performing at least one test indicative of bandwidth.

In one implementation, the method includes capturing a screenshot of the mobile computing device and uploading the screenshot and an element hierarchy.

DETAILED DESCRIPTION

Figure 1A:
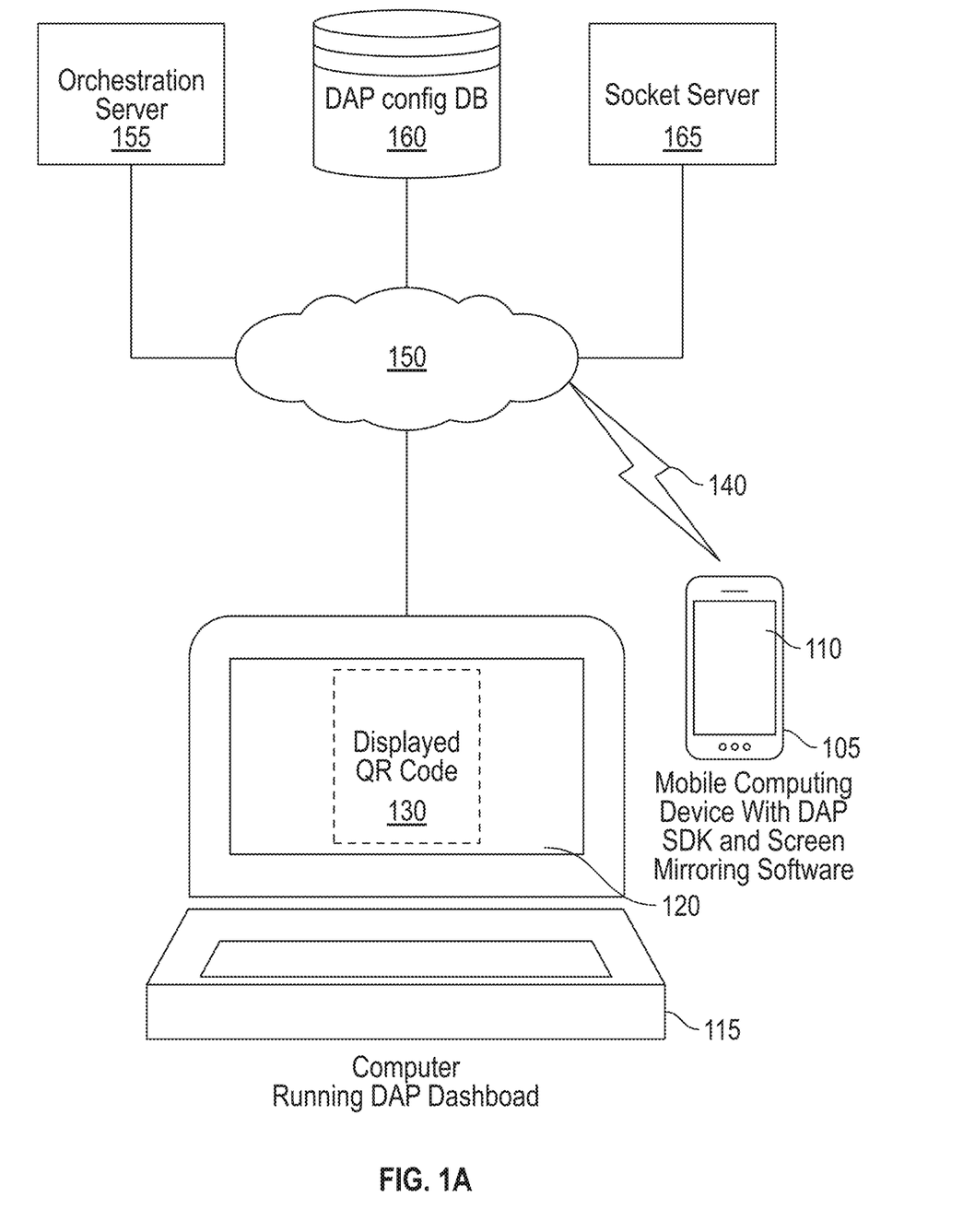
FIG. 1A illustrates a screen mirroring that includes generating a machine-readable optical image on a display screen of a computing device to share a room ID with a mobile device in accordance with an implementation.
Figure 1B:
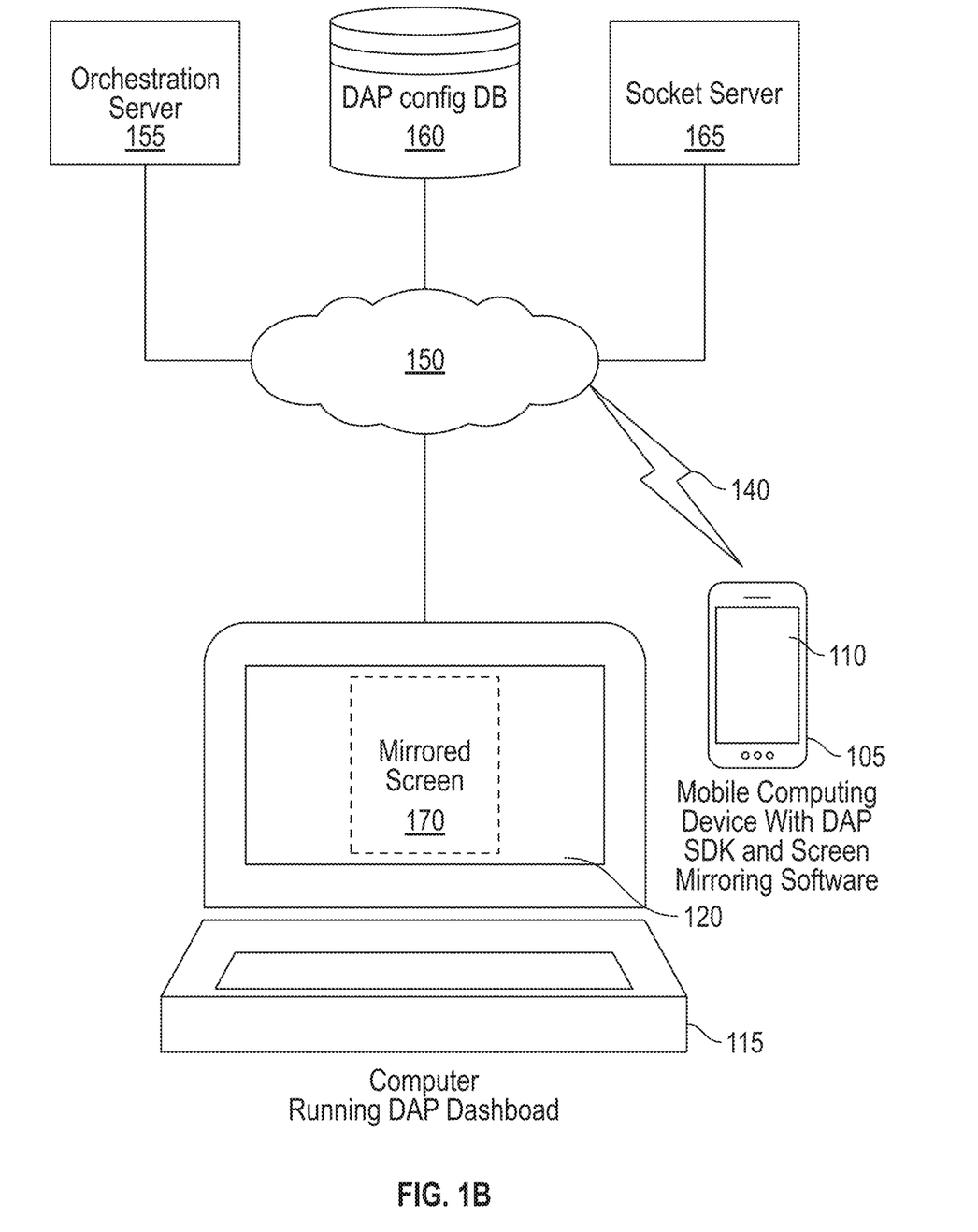
FIG. 1B illustrates the technique of FIG. 1A after screen mirroring commences in accordance with an implementation.

Referring to FIGS. 1A and 1B illustrate a technique for mirroring a mobile device screen 110 of a mobile computing device 105 onto a larger display screen 120 of a computer 115. Mobile computing device 105 may, for example be a smartphone, but more generally it could be other types of small screen mobile computing devices, such as mobile tablet devices. Computer 115 may, for example be a desktop computer or laptop computer (although for ease of description, the term "desktop computer" and "desktop" is used broadly). The mobile computing device 105 may, for example, have a global internet connection (e.g., via a wireless link 140). The mobile computing device 105 may operate a software development kit (SDK) to support DAP.

In one implementation, support for screen mirroring is provided by at least one server to orchestrate the process of screen mirroring, which in one implementation includes an orchestration server 155 and a socket server 165. Support for implementing DAP content creation/editing may be provided by a DAP configuration database 160. In some implementations, other support for a web application for DAP may be provided by a server (e.g., the orchestration server or other server) and the DAP configuration database 160. The orchestration server, 155, socket server 165, and DAP configuration database 160 may be accessed in some implementations via a network connection 150 (e.g., via the Internet, through cloud-based services, etc.).

As illustrated in FIG. 1A, the computer 115 may run a DAP dashboard through, for example, a web application. The mobile computing device 105 may, for example, be a smartphone having a built-in camera, a capability to read optical image codes (e.g., QR codes or other optical image codes), a user interface, processors, memory to store computer code, and a wireless communication capability. The mobile computing device 105 may have an app installed on it, which in turn has the SDK executing on the mobile computing device 105 with software to support screen mirroring.

In one implementation, the SDK integrates DAP into a mobile application. The SDK may be provided to mobile application developers to integrate DAP functionality into their mobile application. That is, application developers insert a few lines of code in their application code to integrate the SDK into their application code. As an example, when the SDK is installed on the mobile computing device 105, a notification may be shown to the author of an option to scan an optical image code (e.g., a QR code) to implement screen mirroring.

In one implementation, the dashboard is implemented as a Web application for a content author to create DAP content for their mobile applications by accessing the DAP dashboard (referred to as a "dashboard" further on).

In one implementation, the socket server 165 is provided for both the dashboard and the SDK to establish a socket connection to the socket server. The socket server 165 acts as an intermediary for their communication.

In one implementation, the orchestration server 155 is a server through which data is written to and read from the DAP config database. In one implementation, the orchestration server 155 is responsible for generating a unique connection identifier (ID), which in one implementation is a room ID. The unique connection ID may be used by computer 115 to generate an optical image code (e.g., a QR code) for establishing a secure screen mirroring session between the dashboard on computer 115 and the SDK of the mobile computing device 105.

As illustrated in FIG. 1A, in one implementation, the computer 115 displays an optical image code 130, such as a QR code, on its display screen 120. The mobile computing device 105 with the installed SDK has a mode of operation in which it scans the optical image code 130 with a camera of the mobile computing device 105, decodes the optical image code 130, and the decoded information is used to establish and mediate screen mirroring 170 as illustrated in FIG. 1B. The decoded information could be used in different ways to mediate screen mirroring, depending on which entities are assigned to validate a match (e.g., the orchestration server, the SDK, or a combination of the two).

The optical image code may be a QR code, which is an initialism for quick response code. A QR code is a type of matrix barcode or two-dimensional barcode that is machine-readable. QR codes are a well-known form of machine-readable optical image code. However, there are also a number of variants, such as a Model 1 QR code, a Micro QR code, an IQR code, as Secure QR code, a Frame QR code, a HCC2D, and a JAB code. Additionally, a variety of alternative machine-readable optical image codes exist. As examples, the Microsoft Tag uses a grid of triangles to encode data. MaxiCode is a 2D barcode that uses circles rather than squares. Data Matrix is another example of an optical image code. However, conventional QR codes are a popular machine-readable optical image code that many mobile devices are configured to read.

In one implementation, the optical image code encodes a room ID, although alternatively it could encode other unique identifier information. The room ID may, for example, be a virtual room of a conversation server. The room ID is analogous to a secret shared between computer 115, orchestration server 155, and the SDK of mobile device 105. It is not a network address that is easily discoverable by a malicious third party. Also, the room ID may be selected from a potentially large number of room IDs, using a selection algorithm (e.g., a random or semirandom selection from available room IDs). Moreover, the room ID may be selected for each instance of screen sharing. The room ID may, for example, be implemented to be a universally unique identifier (UUID), although more generally it need only have enough attributes of uniqueness to be difficult for a malicious third party to discover. Moreover, the use of the room ID may be implemented as an additional measure on top of other security measures.

The content creator uses their mobile computing device 105 to scan a photo of the optical image code. The SDK may, for example, provide a UI feature for the content creator to capture a photo of the optical image code, decode it (e.g., decode a QR code), validate it, and use the information to establish secure communication with the desktop computer. As illustrated in FIG. 1B, the end result is that the mobile device screen is mirrored 170 on the desktop computer.

Figure 2:
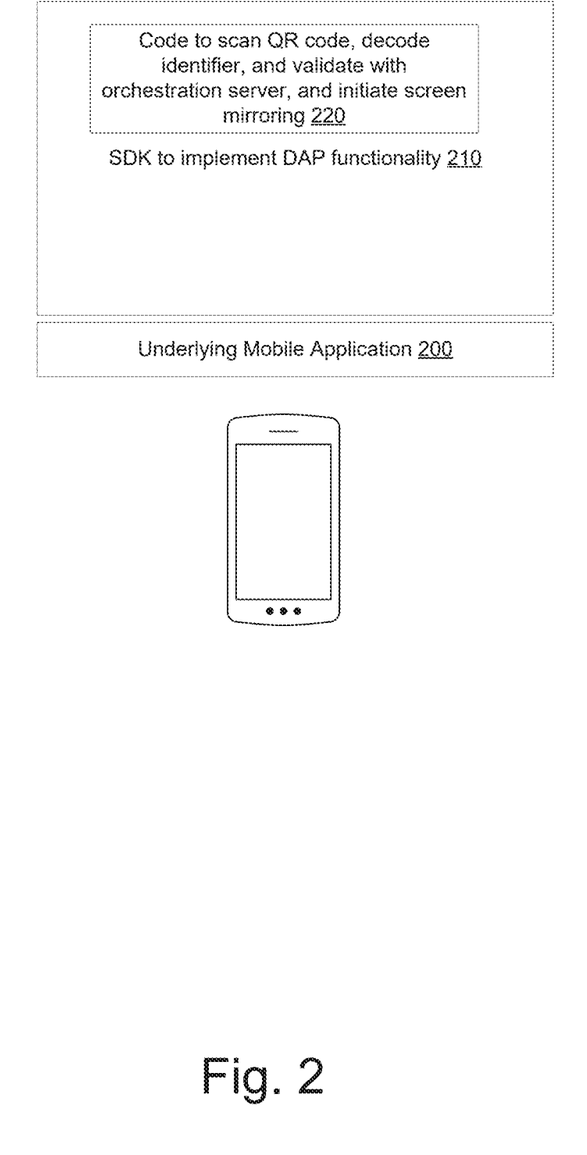
FIG. 2 is a high-level example of SDK screen mirroring features in accordance with an implementation.

FIG. 2 is a high-level image of showing an underlying mobile application 200 for a mobile computing device, the SDK kit 210 to implement the overall DAP functionality on the underlying mobile application, and computer program instructions 220 to support scanning an optical image code and support screen mirroring.

Figure 3:
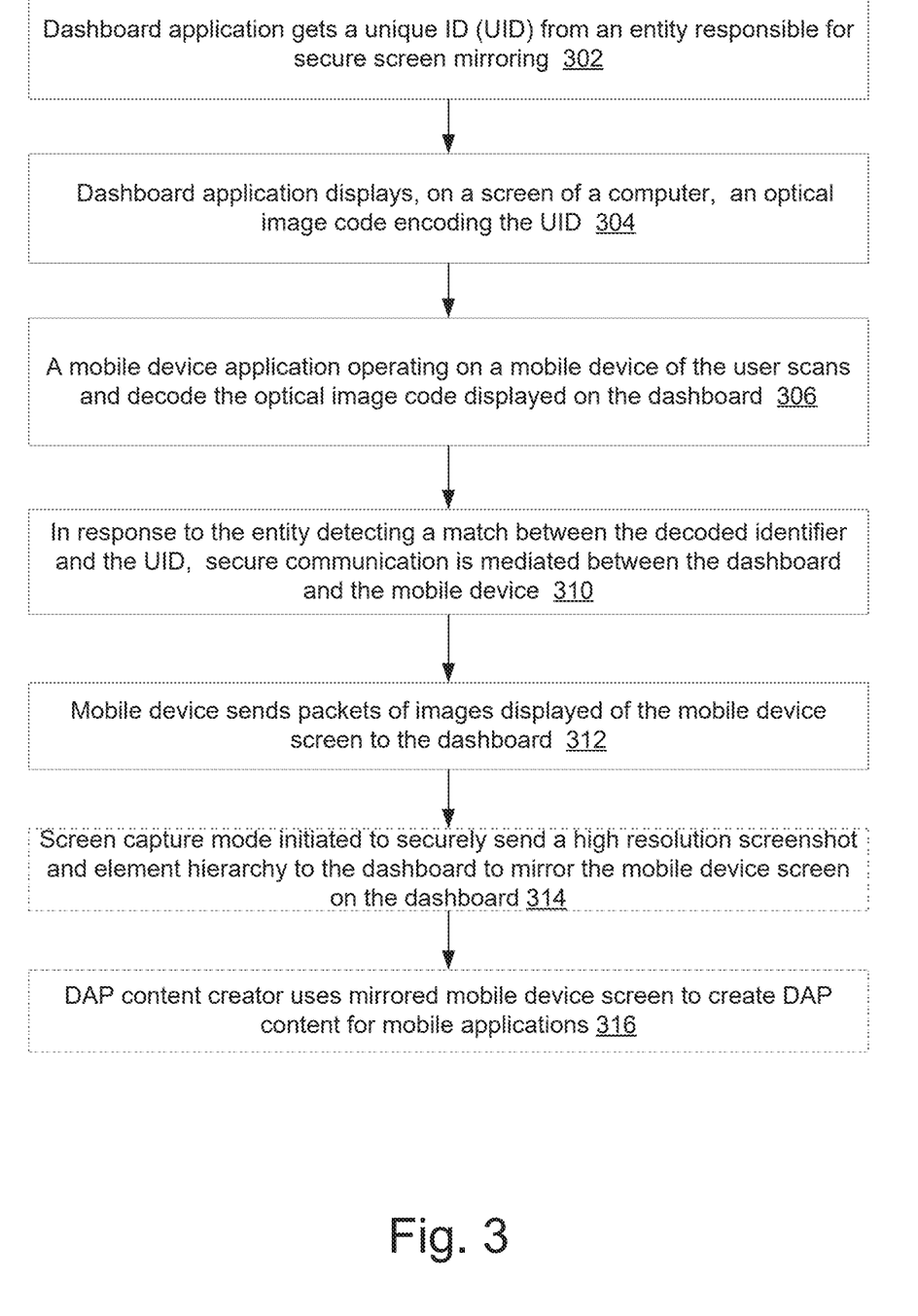
FIG. 3 is a high-level flow chart of a method of screen mirroring in accordance with an implementation.

FIG. 3 is a flow chart of an example of a high-level method in accordance with an implementation. In block 302, the DAP dashboard application requests a unique ID, which in one implementation is a room ID. In one implementation, the unique ID is a universally unique ID (UUID). The request may be made, for example, to the orchestration server 155. In block 304, the DAP dashboard displays, on the display screen 120 of computer 115, an optical image code that encodes the unique ID. The optical image code may be a QR code, although more generally it could be other types of optical image codes capable of being displayed on a display screen. In block 306, a user (e.g., the content creator) scans the optical image code with their mobile computing device 105. The optical image code is decoded, generating a decoded ID. In block 310, communication between the DAP dashboard and the SDK of the mobile is mediated when there is a valid match of the unique ID received by the dashboard and the decoded ID detected by the mobile computing device 105. For example, the decoded ID could be provided by the mobile computing device 105 to orchestration server 155 and the orchestration server 155 could require a valid match as a condition to connect the SDK to a room having a particular ID. Alternatively, the SDK could request the room ID number from the orchestration server 155 and require a match in order to establish a connection to the room.

In one implementation, in response to a valid match of the unique ID and the decoded ID, the SDK provides an image of the mobile device screen to the DAP dashboard. This may be implemented, for example, to approximate a live video feed of the mobile device screen. Various optimizations may be performed, such as using a low-resolution image when bandwidth is limited. As illustrated in block 312, in one implementation the mobile device sends packets of images displayed on the mobile device screen to the dashboard of the computer. In block 314, a screen capture mode is initiated. This may, for example, be implemented by a content creator from the DAP dashboard. The screen capture mode may, for example, capture and send a high-resolution screenshot and screen element hierarchy for screen capture. In some implementations, a variety of security features may be supported to securely upload and provide the high-resolution image for screen capture. In block 316, a DAP content creator may use the captured mobile device screen to create DAP content for mobile applications.

Figure 4:
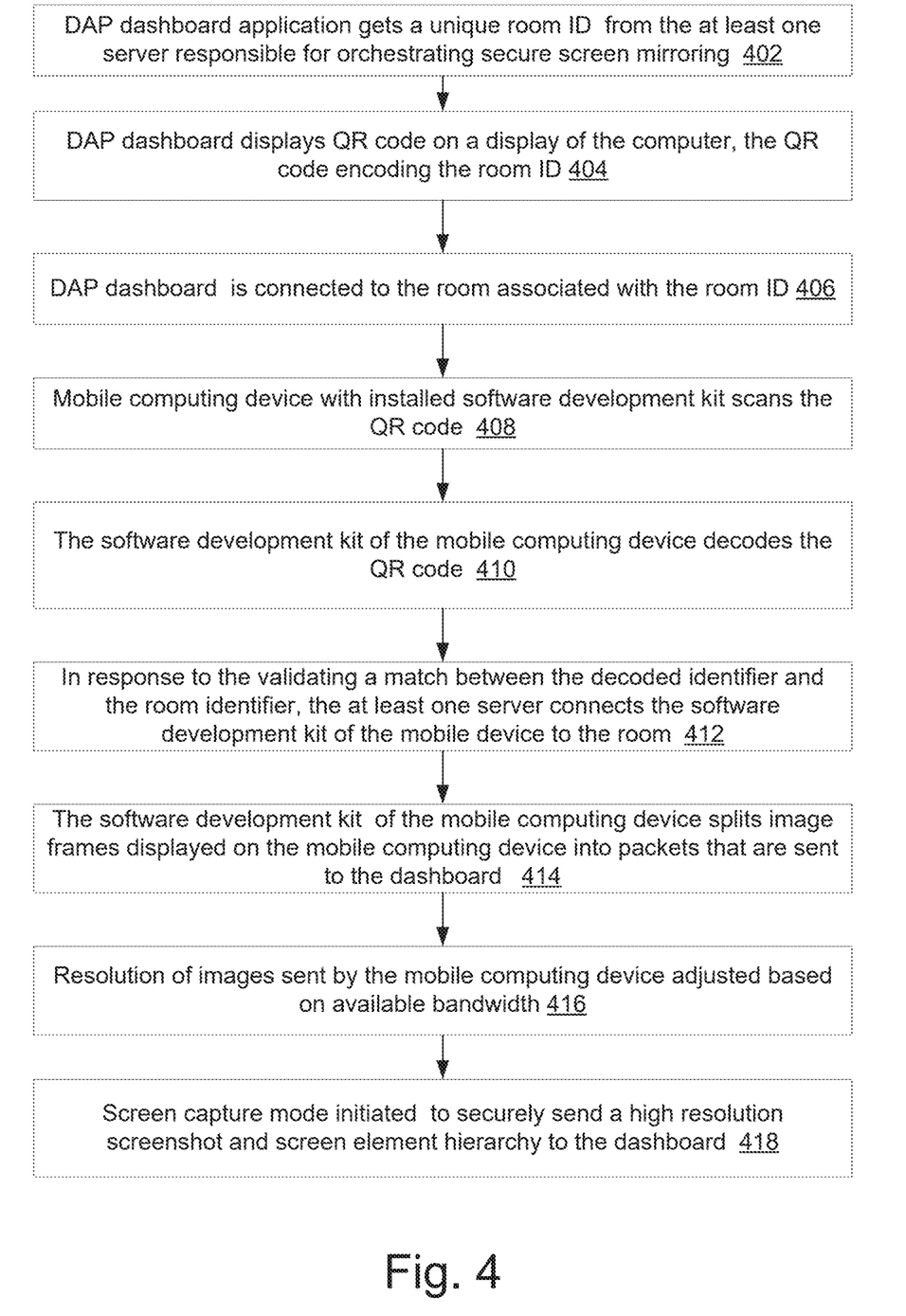
FIG. 4 is a flow chart of a method of screen mirroring using QR codes in accordance with an implementation.

FIG. 4 is an example of a flowchart for a method of screen mirroring using a QR code that adapts the resolution of mirrored screen images. As illustrated in block 402, the DAP dashboard application gets a unique room ID (e.g., from the orchestration server). In block 404, the DAP dashboard displays a QR code that encodes the room ID. In block 406, the DAP dashboard is connected to the room associated with the room ID to wait for a connection with the SDK. In block 408, the mobile computing device SDK scans the QR code. For example, the mobile computing device may have a UI feature, such as a button, for a user to trigger the mobile computing device 105 to scan the QR code using the camera of the mobile computing device 105. In block 410, the SDK of the mobile computing device 105 decodes the QR code. In block 412, in response to validating a match between the decoded identifier and the room identifier, a connection is mediated between at least one server and the SDK of the mobile computing device. The validation of the match may occur in different parts of the system, such as in the orchestration server 155, although other components may also validate a match. In a room paradigm, the dashboard and the SDK communicate through a room having the same room ID. In block 414 the SDK splits image frames displayed on screen of the mobile computing device 105 into packets that are sent to the dashboard displayed on the display screen 120 of computer 115. In some implementations, the resolution of images sent by the mobile computing device 105 is adjusted based on available bandwidth, as illustrated in block 416. In block 418, a screen capture may be initiated to securely send a high-resolution screenshot and screen element hierarchy to the dashboard. For example, a UI button may be provided for a user to initiate the screen capture mode.

Figure 5:
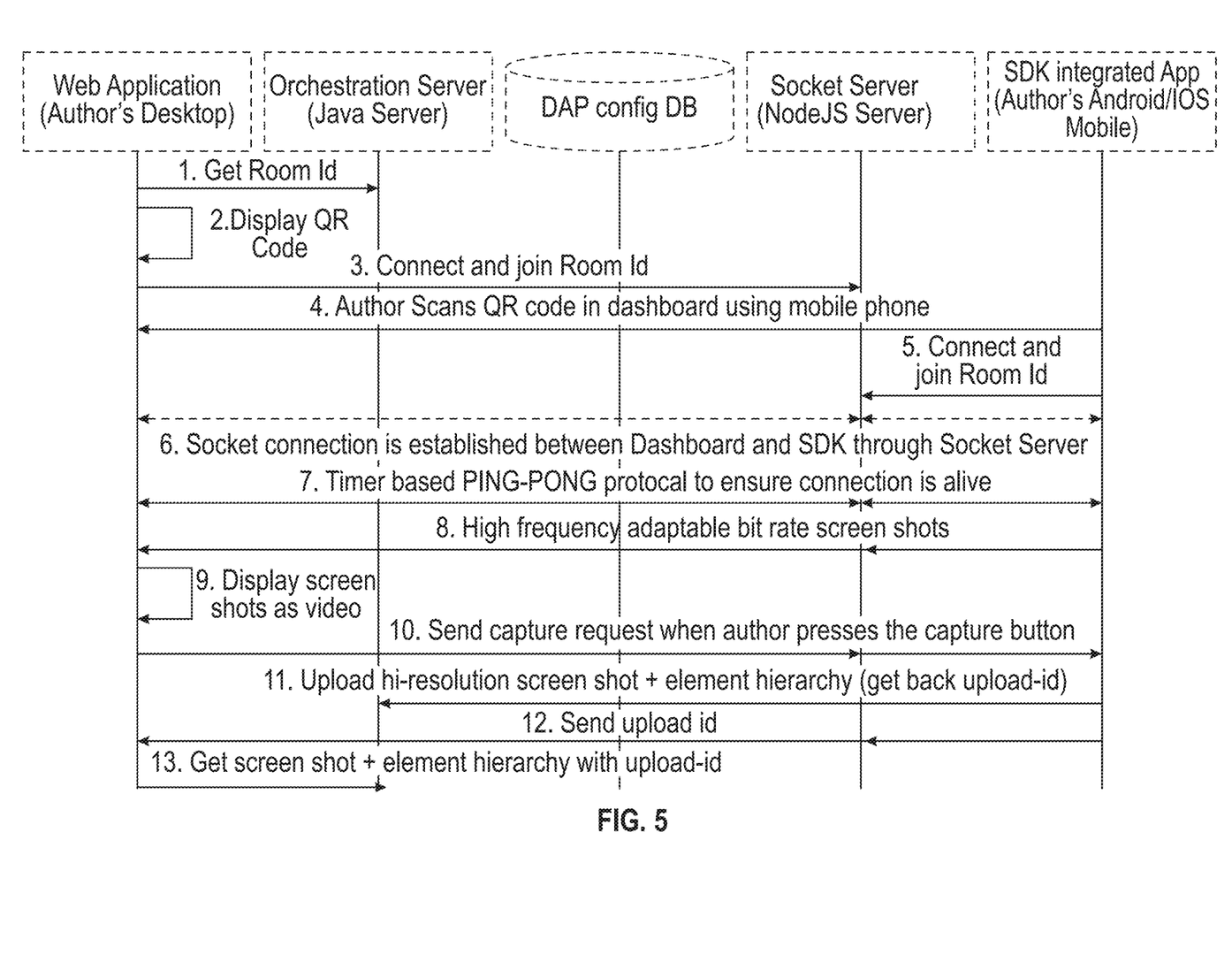
FIG. 5 is an interaction diagram illustrating a method of screen mirroring in accordance with an implementation.

FIG. 5 illustrates an example of a sequence of interactions between a Web Application (the content creator's desktop from which they access the Dashboard), an orchestration server (e.g., a Java Server), a socket server (e.g., a Node JS Server), and an SDK integrated into the content author's mobile computing device (e.g., an Android® or iOS® mobile device). A DAP configuration database is also illustrated as part of an overall DAP solution.

Arrow 1 illustrates an author accessing the dashboard on their Web Application and navigates to create or edit DAP content. In one implementation, this gets the user into an editor window of the dashboard. In arrow 1, the dashboard gets a unique "room ID" from the orchestration server.

As illustrated by arrow 2, the dashboard displays a QR code that encodes the "room ID". As an example, the QR code may be visible to the author on a pane of the dashboard.

As illustrated by arrow 3, the dashboard connects to the socket server and joins the "room ID".

As illustrated by arrow 4, the author accesses the mobile computing device and presses a scan QR button available on the notification bar. For example, the user may point the camera frame of their mobile computing device at the QR code, press a button, and the mobile computing device then scans the QR code displayed in the dashboard.

As illustrated by arrow 5, the SDK gets the "room ID" from the QR code. In one implementation, the generated room ID is a UUID. The SDK validates the room ID with the orchestration server and, if valid, connects to the socket server and joins the "room ID". This secures the connection between the dashboard and the SDK. Also, in one implementation, all connections to the socket server and the orchestration server are secured via secure sockets layer (SSL).

As illustrated by arrow 6, once both the dashboard and the SDK join the room, the socket server mediates communication between the two and the mobile application's screen will start mirroring on the dashboard. In one implementation, the mobile SDK performs the mirroring to approximate live video streaming. In one implementation, the mobile SDK captures 24 frames/images of the visible screen of the mobile application per second. In one implementation, the SDK then splits each frame into multiple packets of maximum size 10 KB and sends it via socket server to the dashboard. All packets of a frame are then combined at the dashboard and an image of the mobile device screen is displayed. Since there are 24 images being sent every second, the dashboard experience simulates streaming of the mobile application screen.

A variety of features may be included to address the issue of connection failures. As illustrated by arrow 7, in one implementation, once the packet transfer begins, the dashboard and the mobile SDK start to send a ping every 3 seconds to each other to check if the other device is online/reachable or not. In one implementation, when the dashboard receives a ping it sends a pong and the same is the case with the mobile SDK. Before sending a PING, the dashboard and the mobile SDK checks the time of the last received PONG. If the dashboard hasn't received a PONG for the last PING packets it had sent, then it times out and resets the connection. This is called the Ping failure scenario. In this situation, the dashboard stops receiving streaming packets from the mobile SDK, and asks the orchestration server for a new room ID and connects to it. The dashboard displays a new QR code that encodes the new "room ID". In one implementation a visible notification is provided to the content author on the dashboard. In this scenario, the mobile SDK also closes the connection, displays an error message on the mobile application called "Session Timed out" and waits for a new QR code to be scanned.

A variety of features may be included for the approach to adapt to the available network bandwidth. As illustrated by arrow 8, in one implementation the SDK connection with the dashboard works even in low bandwidth conditions (e.g., 3G connections). To ensure this, the mobile SDK sends only low-resolution images/frames and resolution is adaptively changed based on the network bandwidth on the mobile application. For example, in one implementation, the mobile SDK, after joining the room ID, checks the internet connection bandwidth by uploading a small file (around 10 KB). It then calculates the time to upload an image over the network. In one implementation, if the calculated upload time is less than HIRES_UPLOAD_TIME (pre-configured to 55 seconds but could be configured in the system to a different time period), the mobile SDK starts to send high-resolution images (e.g., 100% of a selected maximum resolution) for streaming on the dashboard. In one implementation, if the calculated upload time is more than HIRES_UPLOAD_TIME, the mobile SDK downgrades the images by the same factor and sends it to the dashboard. The minimum resolution it maintains is 20%. However, the minimum resolution could be selected to be a higher percentage (e.g., 25%, 30%, 50%, etc.) In one implementation, to conserve bandwidth, the mobile SDK sends an image via socket only if the image is different from the previous image it sent. Many variations on these approaches are possible, such as sending only the portion of the image that changes as a delta change. The main point is that the bit rate for sending screen shots may be adapted based on the available bandwidth, such as by varying image resolution, sending only different images, etc.

As illustrated by arrow 9, as a result of steps mentioned in points 6, 7, 8 above, the mobile screen is smoothly mirrored into the dashboard even in low bandwidth networks. In such scenarios, the resolution is degraded but the functionality is still retained.

As illustrated by arrow 10, in one implementation, the content selects the user interface element of the mobile application in the dashboard. The dashboard sends a "SCREEN_CAPTURE" request to the SDK via the socket server.

In arrow 11, the SDK uploads high resolution screenshots along with the hierarchy of the mobile application screen to the orchestration server. The orchestration server returns back a unique upload ID.

In arrow 12, the SDK sends the upload ID to the dashboard via sockets.

In arrow 13, the dashboard fetches the uploaded screenshot and element hierarchy from the orchestration server. A benefit of this approach is that it doesn't require large amounts of data to be sent by socket communication. Instead, the payload is sent via secure HTTP and the upload ID is sent via the socket connection.

Figure 6:
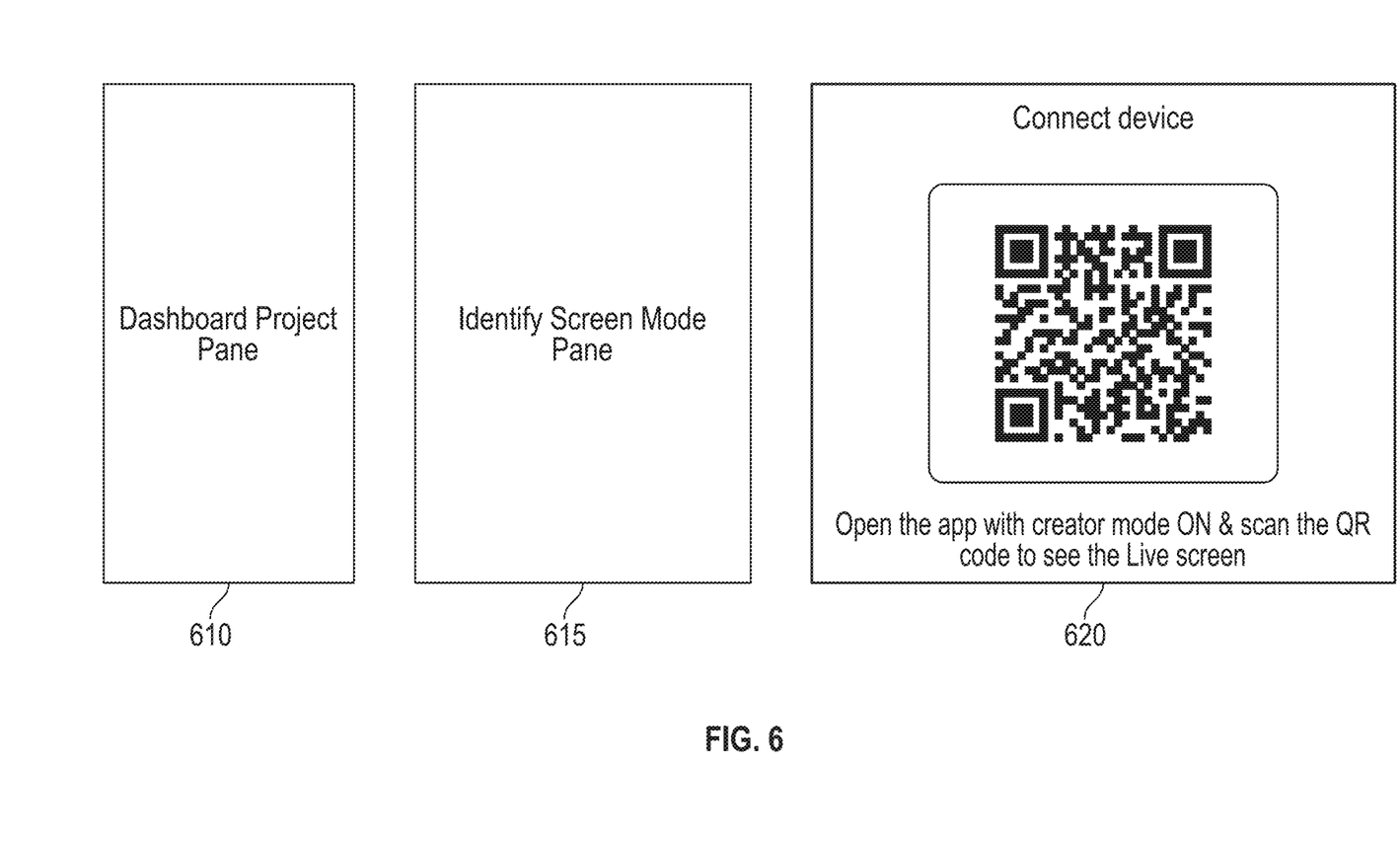
FIG. 6 illustrates aspects of a dashboard in accordance with an implementation.

FIG. 6 illustrates aspects of a dashboard UI in accordance with an implementation. In one implementation, content author may access a project pane 610 to begin editing DAP content. A screen identity pane 615 may be initially blank. A scan QR code pane 620 may be displayed with instructions on how to connect the mobile computing device for screen mirroring by scanning the QR code with a content creator mode on.

Figure 7A:
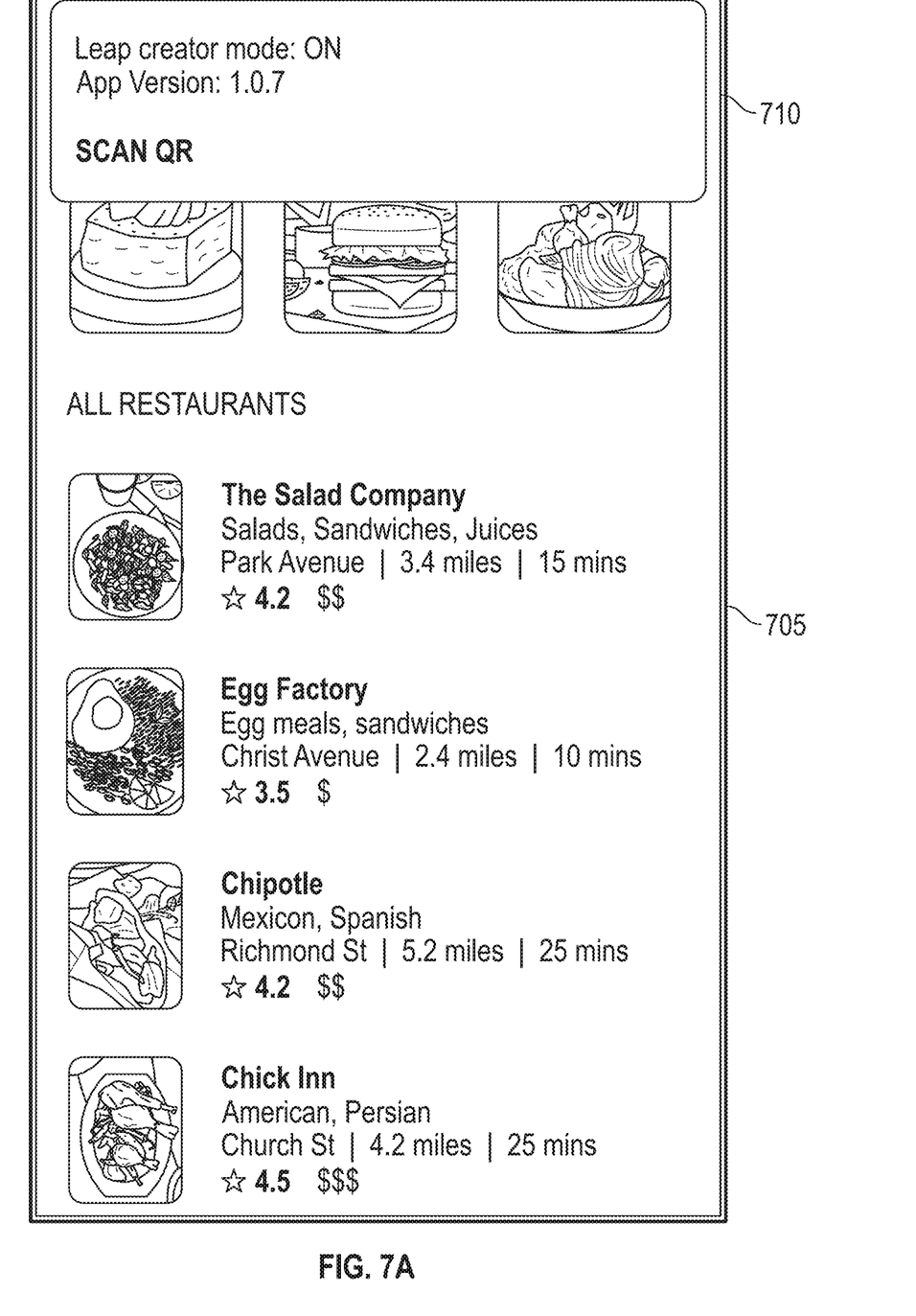
FIG. 7A illustrates an example of a mobile device screen displaying a mobile application screen and additional information regarding an option to scan a QR code in accordance with an implementation.
Figure 7B:
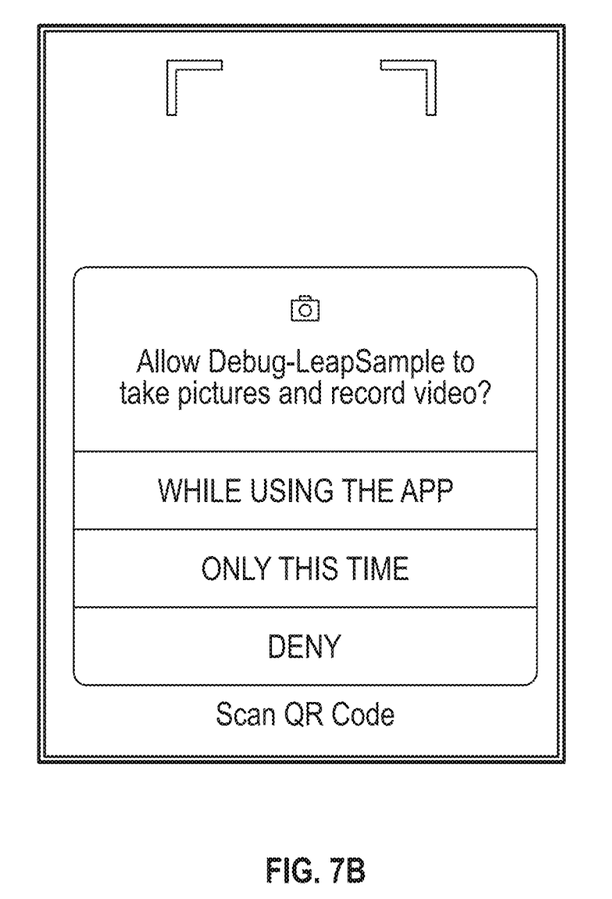
FIG. 7B illustrates an example of a mobile device screen UI features for allowing to use the mobile device camera to scan the QR code in accordance with an implementation.

FIG. 7A illustrates an example of a mobile device screen 705 with a creator mode on and a SCAN QR instructions 710 displayed. As illustrated in FIG. 7B, a mobile computing device UI may, for example, request permission to take pictures to scan a QR code.

Figure 8:
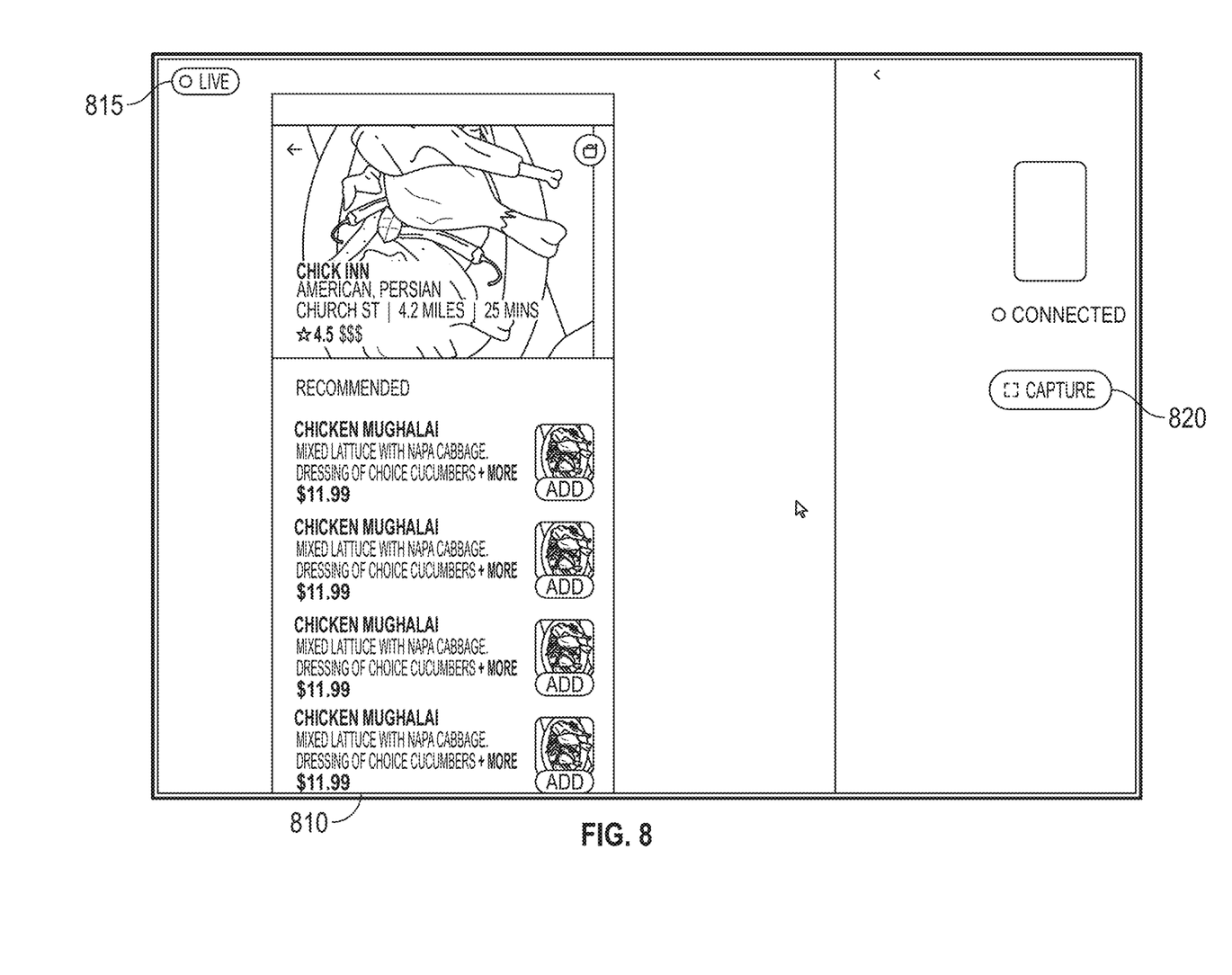
FIG. 8 illustrates an example of screen sharing of a live streaming and a UI feature to capture a high-resolution image in accordance with an implementation.

FIG. 8 illustrates the dashboard mirroring the mobile device screen 810. UI features may include, for example, notification 815 of live streaming and a capture button 820.

Figure 9:
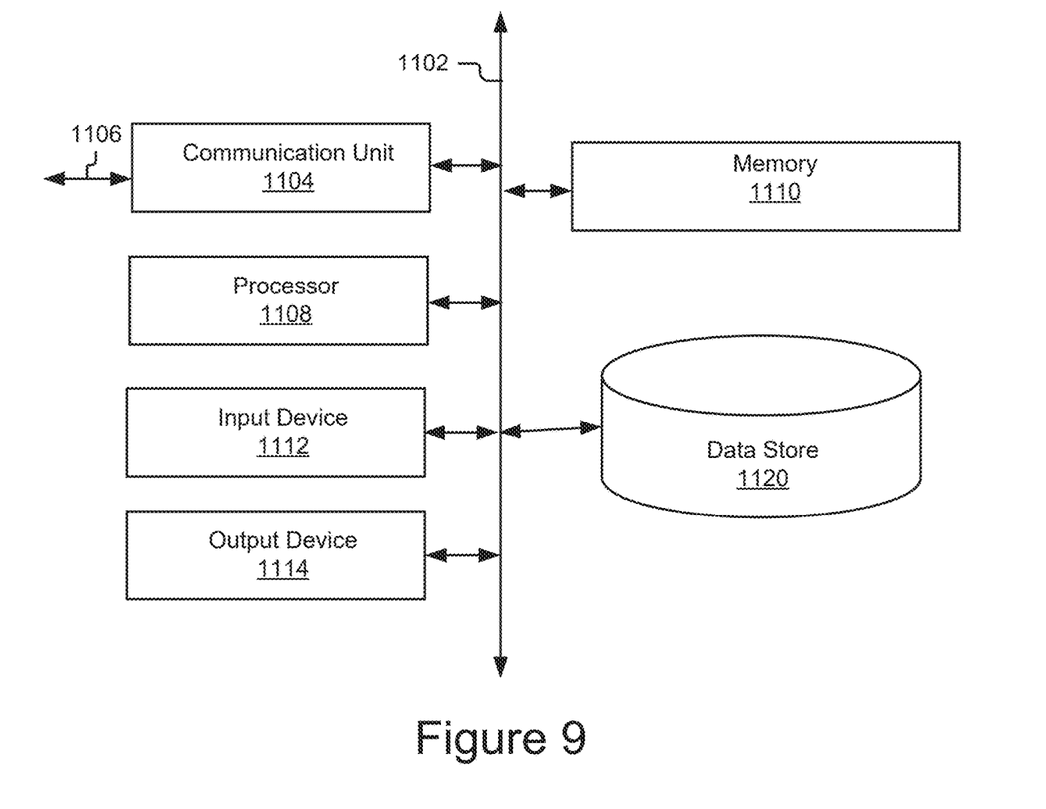
FIG. 9 illustrates a general server environment for implementing an orchestration server in accordance with an implementation.

It will be understood that the functionality of the orchestration server may be implemented using computer program instructions executing on a server architecture. Referring to FIG. 9, the orchestration server may include hardware components such as a memory 1110, data store 1120, output device 1114 (e.g., a display screen), an input device 1112, a processor 1108, and a communication unit 1104 to communicate with a computer network, such as a LAN, WAN, the internet, etc.

The technique provides a variety of benefits for screen mirroring. A cable connection is not required between the mobile computing device 105 and the computer 115 to perform the screen mirroring. A Wi-Fi connection between the mobile computing device 105 and the computer 115 is also not required for the screen mirroring.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like New, Upload, Sync, and Open in One Drive.

To ease description, some elements of the system and/or the methods are referred to using the labels first, second, third, etc. These labels are intended to help in distinguishing the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes, but is not limited to, firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or Output devices (including, but not limited to, keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method, comprising:
    generating, by a first server, a unique connection identifier for a secure communication channel between a dashboard of a Web application displayed on a computer and a digital adoption platform (DAP) application of a mobile application of a mobile computing device, the unique connection identifier being different than a network address identifier associated with the first server;
    providing, by the first server, the unique connection identifier to the dashboard of the Web application of the computer to display, on a display screen of the computer, a machine-readable optical image code encoding the unique connection identifier;
    monitoring, by the first server, for receipt of the unique connection identifier from the mobile computing device, the DAP application of the mobile computing device being configured to optically scan and decode the optical image code, and transmit the unique connection identifier via a wireless Internet communication link to the first server;

identifying, by the first server, a match of the unique connection identifier received from the mobile computing device and the unique connection identifier sent by the first server to the dashboard of the Web Application, and in response authorizing sharing of screen images and associated screen element hierarchies from the mobile computing device to the dashboard of the web application displayed by the computer; and mediating, in response to the match, sharing of screen images and a corresponding screen element hierarchy of a display screen of the mobile computing device with the computer;

providing, by the first server, access of the dashboard of the Web application with a DAP configuration database for a user of the computer to create or edit DAP content for the mobile application of the mobile computing device.

2. The method of claim 1, wherein the computer and the mobile device are associated with the same DAP author.

3. The method of claim 2, wherein the unique connection identifier is randomly generated to support an individual instance of screen sharing.

4. The method of claim 1, where the first server is configured to orchestrate an initial secure one to one communication channel and a socket server is used to share the screen images and the associated screen element hierarchies from the mobile computing device to the computer.

5. The method of claim 1, wherein the optical image code is a QR code.

6. The method of claim 1, wherein the sharing of screen images comprises live streaming of user interface display contents of the mobile computing device.

7. The method of claim 6, wherein live streaming of user interface display contents of the mobile computing device has a resolution adapted based at least in part on a bandwidth of a wireless Internet communication link of the mobile computing device.

8. The method of claim 6, wherein a screen resolution is adapted, based on performing at least one test indicative of the bandwidth.

9. A method, comprising:
displaying, on a display screen of a computer, a machine-readable code encoding a unique connection identifier generated by a server for an individual session of digital adoption platform (DAP) creation or editing of DAP content;

scanning and decoding the machine-readable code with a mobile computing device and transmitting the unique connection identifier from the mobile computing device to the server; and in response to the server validating a match of the unique connection identifier authorizing sharing of a screen capture of a display screen of the mobile computing device and a screen element hierarchy with the computer;

wherein the computer and the mobile computing device are used during the individual session by a DAP content author to create or edit a mobile device DAP using a dashboard on the display screen of the computer.

10. A method, comprising:
displaying, on a display screen of a computer, a machine-readable code encoding a unique connection identifier generated by a server for an individual session of digital adoption platform (DAP) creation or editing of DAP content;

scanning and decoding the machine-readable code with a mobile computing device and transmitting the unique connection identifier from the mobile computing device to the server;

in response to the server validating a match of the unique connection identifier authorizing secure sharing of a screen capture of the display screen of the mobile computing device and a screen element hierarchy with the computer; and wherein a continuous sequence of screen captures simulates a near real-time view of the mobile device display screen on the display screen of the computer for creation or editing of mobile device DAP content.

11. A method for using a desktop computer to create or edit digital adoption platform (DAP) content for a mobile application of a mobile computing device, comprising:

scanning, decoding, and transmitting by the mobile computing device, of an optical image code displayed on a desktop of the computer, to generate a unique connection identifier for a communication session between the computer and the mobile computing device;

wirelessly providing the unique connection identifier to a server responsible for orchestrating secure communication between the mobile computing device and the computer;

enabling, via the server, screen captures and corresponding screen element hierarchies of the display screen of a digital adoption platform of mobile application of the mobile computing device to be sent to the computer; and receiving and displaying, on the desktop of the computer, the screen captures and associated element hierarchies from the mobile computing device to facilitate the creation or editing of mobile device DAP content associated with the mobile application.

12. A method for using a desktop computer to create or edit digital adoption platform (DAP) content for a mobile application of a mobile computing device, comprising:

generating, by at least one server, a unique connection identifier for a secure communication session between a Web application of the computer and a digital adoption platform (DAP) application of the mobile application of the mobile computing device, the unique connection identifier;

providing, by the at least one server, the unique connection identifier to the web application of the computer to display, on a display screen of the computer, a machine-readable optical image code encoding the unique connection identifier;

monitoring, by the at least one server, for receipt of the unique connection identifier from the mobile computing device, the DAP application of the mobile computing device being configured to optically scan and decode the optical image code, and transmit the unique connection identifier via a wireless Internet communication link to the at least one server;

identifying, by the at least one server, a match of the connection identifier received from the mobile computing device and the connection identifier sent to the at least one server, and in response authorizing sharing of screen images and associated screen element hierarchies from the mobile computing device to the computer; and mediating by the at least one server, in response to the match, sharing of screen images and a corresponding screen element hierarchy of the display screen of the mobile computing device with the web application of the computer to replicate the display screen of the mobile computing device on the display of the computer;

wherein a DAP content author uses the display screen of the computer to create or edit DAP content for the mobile application of the mobile computing device.

13. The method of claim 12, further comprising:

providing, by the at least one server, access of the web application of the computer with a DAP configuration database for a user of the computer to create or edit DAP content for the mobile application of the mobile computing device.

14. A method, comprising:

displaying, on a display screen of a computer a machine-readable code encoding a unique connection identifier generated by a server for an individual session of digital adoption platform (DAP) creation or editing of DAP content;

scanning and decoding the machine-readable code with a mobile computing device and transmitting the unique connection identifier from the mobile computing device to the server;

in response to the server validating a match of the unique connection identifier authorizing sharing of a screen capture of the display screen of the mobile computing device and a screen element hierarchy with the computer; and wherein the computer and the mobile computing device are operated by the same DAP content author, during a secure communication session, for creating or editing mobile device DAP content using the display screen of the computer.

15. A method for using a desktop computer to create or edit digital adoption platform (DAP) content for a mobile application of a mobile computing device, comprising:

scanning, decoding, and transmitting by the mobile computing device, of an optical image code displayed on a desktop of the computer, to generate a unique connection identifier for a secure communication session between the computer and the mobile computing device;

wirelessly providing the unique connection identifier to a server responsible for orchestrating secure the secure communication session between the mobile computing device and the computer;

enabling, via the server, screen captures and corresponding screen element hierarchies of the display screen of a digital adoption platform of mobile application of the mobile computing device to be sent to the computer;

receiving and displaying, on the desktop of the computer, the screen captures and element hierarchies from the mobile computing device to facilitate creation or editing of DAP content associated with the mobile application; and wherein the computer and the mobile computing device are operated by the same DAP content author, during the secure communication session, for creating or editing mobile device DAP content using a display screen of the computer.

* * * * *